United States Patent
Arai et al.

(10) Patent No.: US 7,229,083 B2
(45) Date of Patent: Jun. 12, 2007

(54) STROLLER ON WHICH BASKET CAN BE MOUNTED

(75) Inventors: Yuichi Arai, Saitama (JP); Kazunao Ogura, Saitama (JP); Toshiro Yoshie, Tokyo-To (JP)

(73) Assignee: Combi Corporation, Tokyo-To (JP)

( * ) Notice: Subject to any disclaimer, the term of this patent is extended or adjusted under 35 U.S.C. 154(b) by 197 days.

(21) Appl. No.: 11/002,308

(22) Filed: Dec. 3, 2004

(65) Prior Publication Data

US 2005/0121871 A1 Jun. 9, 2005

(30) Foreign Application Priority Data

Dec. 3, 2003 (JP) ............... 2003-404743
Dec. 3, 2003 (JP) ............... 2003-404772

(51) Int. Cl.
*B62B 9/00* (2006.01)
*B62B 3/00* (2006.01)
*B62B 7/00* (2006.01)

(52) U.S. Cl. .................. 280/47.38; 280/642; 280/647; 280/643; 280/650

(58) Field of Classification Search ............. 280/47.38, 280/642, 647, 650, 643
See application file for complete search history.

(56) References Cited

U.S. PATENT DOCUMENTS

| | | | | |
|---|---|---|---|---|
| D305,218 S | * | 12/1989 | Nakao et al. | D12/129 |
| 5,676,386 A | * | 10/1997 | Huang | 280/30 |
| 6,062,589 A | * | 5/2000 | Cheng | 280/647 |
| 6,241,273 B1 | * | 6/2001 | Gehr | 280/642 |
| 6,412,794 B1 | * | 7/2002 | Phillips et al. | 280/14.22 |
| 6,478,327 B1 | * | 11/2002 | Hartenstine et al. | 280/642 |
| 6,746,075 B2 | * | 6/2004 | Cheng et al. | 297/149 |
| 2005/0098983 A1 | * | 5/2005 | Cheng et al. | 280/642 |

FOREIGN PATENT DOCUMENTS

JP 2002-225717 8/2002

* cited by examiner

*Primary Examiner*—Christopher P. Ellis
*Assistant Examiner*—John R. Olszewski
(74) *Attorney, Agent, or Firm*—Wenderoth, Lind & Ponack, L.L.P.

(57) ABSTRACT

A stroller includes a stroller body and a basket support mechanism. The stroller body has two front legs, two rear legs, a handle, and a seat support part. The basket support mechanism has a basket support member disposed below the rear legs of the stroller body, and a flexible member disposed between the basket support member and a front upper part of the stroller body.

17 Claims, 9 Drawing Sheets

STROLLER ON WHICH BASKET CAN BE MOUNTED

BACKGROUND OF THE INVENTION

1. Field of the Invention

The present invention relates to a stroller on which a shopping basket can be stably mounted, while keeping a baby in the stroller.

2. Background Art

One type of conventional stroller includes a pair of right and left front legs, a pair of right and left rear legs, and a handle.

In a supermarket, a shopper carries in one hand a shopping basket containing therein items to be purchased, while operating a stroller with a baby using the other hand. It is inconvenient to carry the shopping basket in one hand when there are a lot of items in the basket, and this causes an unstable operation of the stroller. In addition, when taking an article from a shelf, the shopper must take his or her hand off the stroller, which is dangerous to the baby in the stroller.

Thus, a supermarket generally has shopping carts for common use on which a baby can be put. Various kinds of shopping carts have been proposed. For example, Japanese Patent Laid-Open Publication No. 2002-225717 discloses such a shopping cart.

However, in order to use such a shopping cart in a supermarket, one must take a baby out of a stroller and put the baby on the shopping cart. In addition, a storage space is needed for the stroller.

The shopping cart disclosed in Japanese Patent Laid-Open Publication No. 2002-225717 has a shape similar to a practically used stroller. A shopping basket can be mounted on a rear side of the shopping cart. However, since such a shopping cart is designed to be used in a supermarket, it is naturally impossible to use the shopping cart as a general stroller due to issues of safety and size.

There is also a demand for a stroller that can be folded using only one hand, and have a reduced height dimension when the stroller is folded.

This patent application claims a priority based on Japanese Patent Application Nos. 2003-404743 and 2003-404772, the disclosure of which being incorporated herein by reference.

The present invention is made in view of the above problems. An object of the present invention is to provide a stroller on which a shopping basket can be stably mounted, while keeping a baby in the stroller.

Another object of the present invention is to provide a stroller which can be folded using only one hand, and have a reduced height dimension when the stroller is folded.

SUMMARY OF THE INVENTION

The present invention is a stroller on which a basket can be mounted, comprising: a stroller body including two front legs, two rear legs, a handle, and a seat support part; and a basket support mechanism including a basket support member disposed below the rear legs, and a flexible member disposed and extending between the basket support member and a front upper part of the stroller body.

In the stroller, the basket support member may connect the rear legs to each other.

In the stroller, the basket support member may have two support projected parts for supporting a basket, which are oppositely extended from the respective rear legs.

In the stroller, the basket support member may be formed of a connecting shaft of rear wheels disposed between lower portions of the pair of rear legs, or a connecting shaft sleeve covering the connecting shaft.

In the stroller, the basket support member may have a projection to be engaged with a basket.

In the stroller, the flexible member can be detached from the basket support member and the stroller body.

In the stroller, the flexible member may have a hook, and the basket support member may have an engagement opening to be engaged with the hook of the flexible member.

In the stroller, one end of the flexible member may be connected to the seat support part of the stroller body.

In the stroller, the flexible member may be formed of a belt.

In the stroller, the flexible member may have a Y-shape.

According to the present invention, by inserting a shopping basket from between the pair of rear legs to a front part of the stroller, the basket is mounted on the stroller such that a rear side of the basket is supported by the basket support member, while a front end thereof is supported by the flexible member. Thus, the basket can be stably mounted below the seat support part of the stroller, while keeping a baby in the stroller.

The present invention is a stroller comprising: two front legs; two casings secured to upper portions of the front legs; two rear legs swingably connected to the casings; a handle slidably passing through the casings; two first links swingably connected to the handle below the casings; two second links swingably connected to the first links and swingably connected to the rear legs; and two third links swingably connected to the second links and swingably connected to the front legs; wherein the stroller can be folded and unfolded by sliding the handle with respect to the casings.

In the stroller, the second links and the third links may be aligned with each other, when the stroller is unfolded.

In the stroller the third links may constitute a seat support part.

In the stroller, parts of the second links on the side of the third links may constitute the seat support part.

In the stroller, a backrest may be swingably attached to the second links.

In the stroller, the second links may have a U-shaped portion projected rearwardly of the rear legs, on which a basket for containing therein a baggage is hung.

In the stroller, a guard member may be disposed on upper portions of the rear legs.

According to the present invention, by pushing the handle downward and operating an engagement pin unlocking device of the handle, an unfolded stroller can be folded. Thus, the stroller can be easily folded using only one hand. Since the handle is slid downward with respect to the casings, a folded stroller can be small in a height direction, as well as in back and forth direction.

DETAILED DESCRIPTION OF THE PREFERRED EMBODIMENTS

First Embodiment

A first embodiment of the present invention will be described below with reference to the drawings.

FIGS. 1 to 6 show a stroller 10 of the first embodiment according to the present invention.

Figure 1:
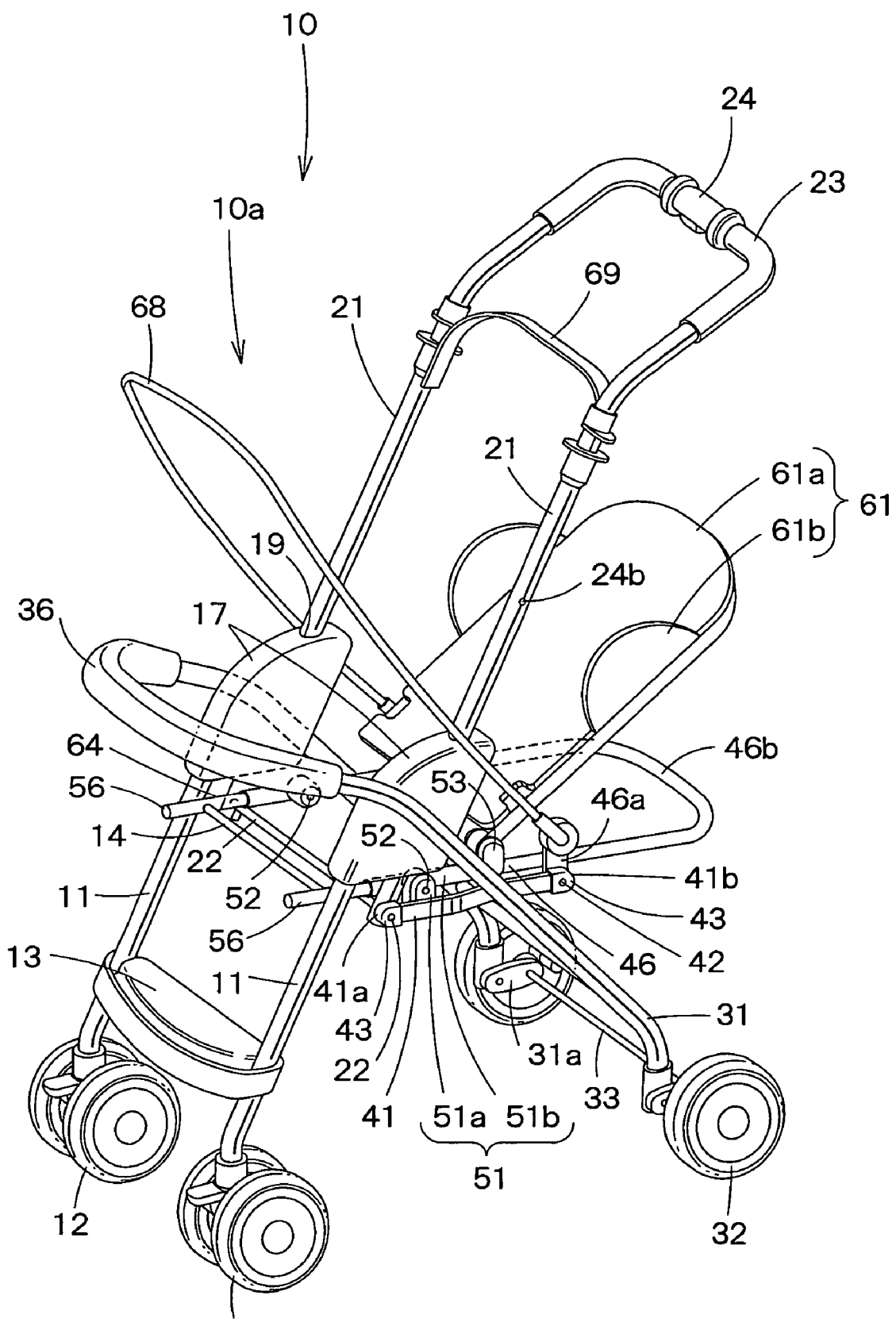
FIG. 1 is a perspective view showing a unfolded stroller of a first embodiment according to the present invention.
Figure 2:
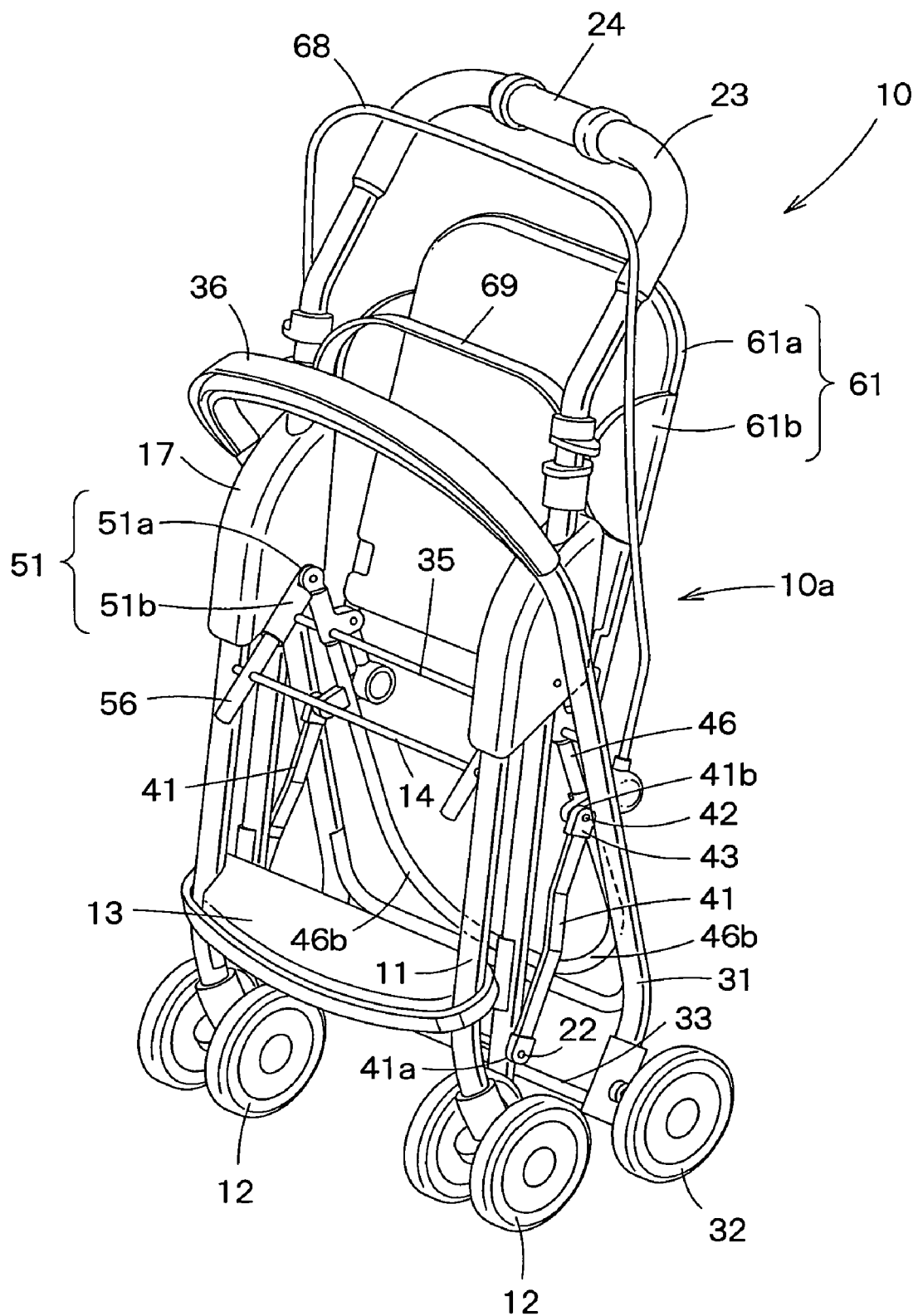
FIG. 2 is a perspective view showing the folded stroller of the first embodiment according to the present invention.
Figure 3:
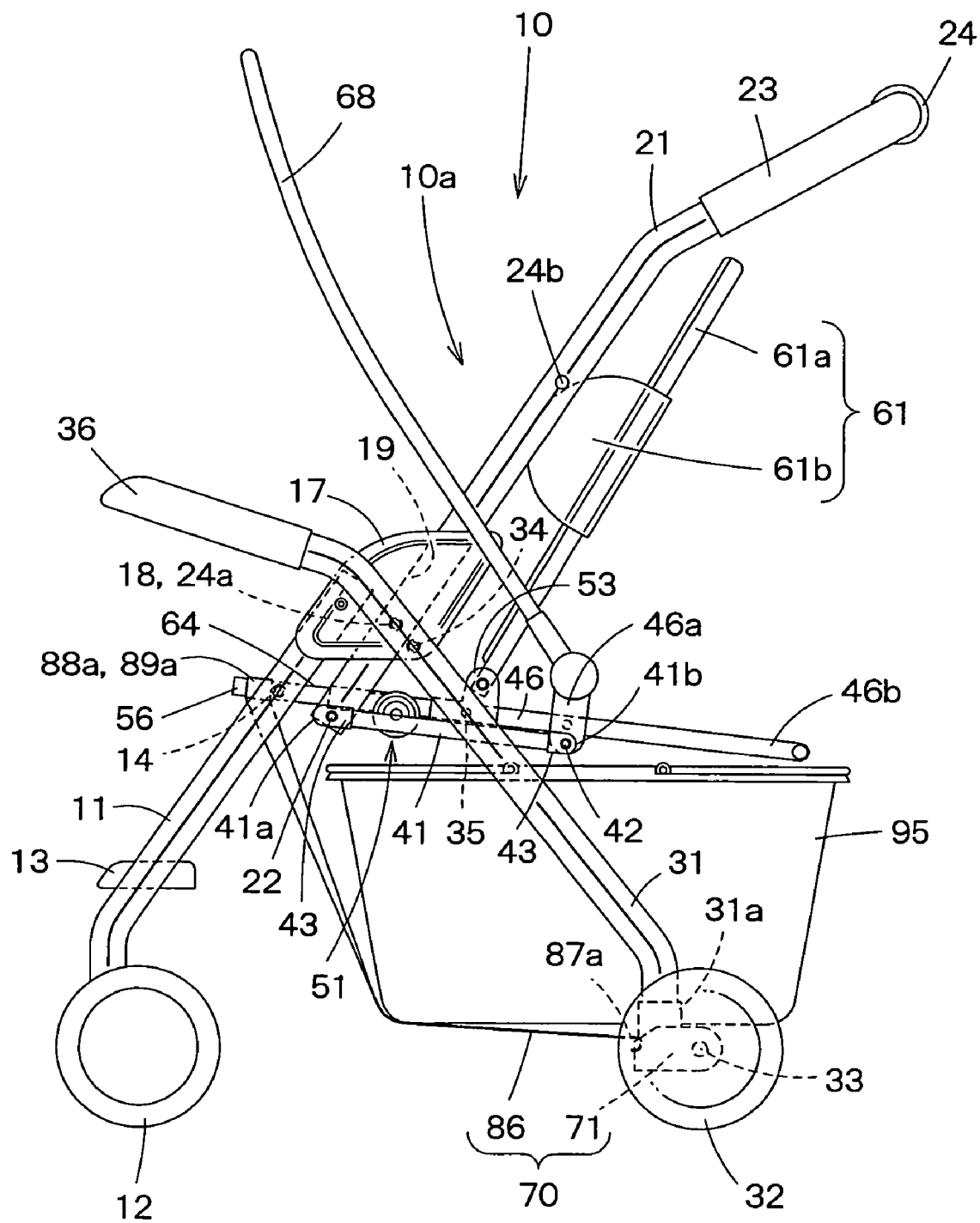
FIG. 3 is a side view showing the unfolded stroller of the first embodiment according to the present invention.
Figure 4:
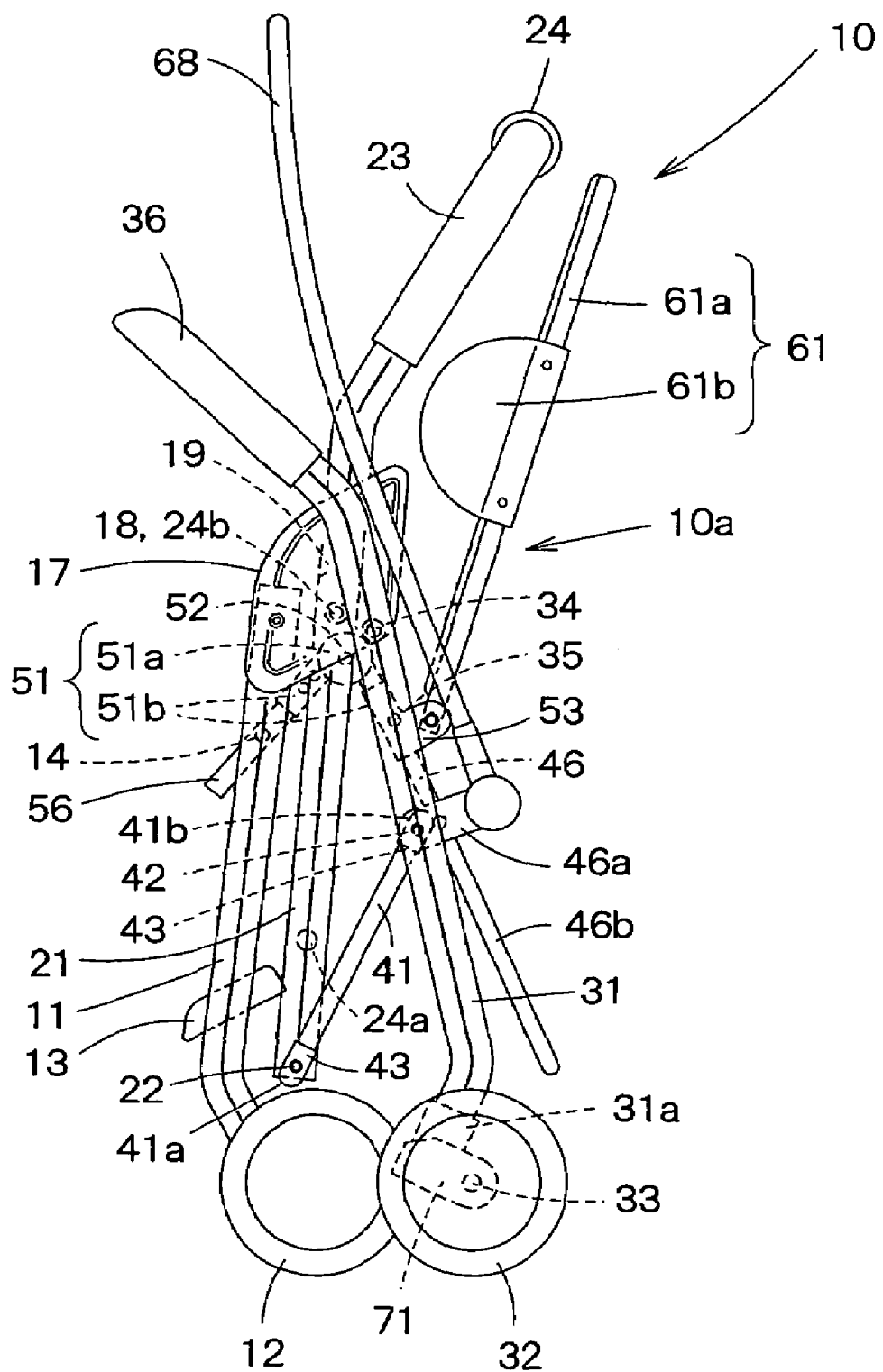
FIG. 4 is a side view showing the folded stroller of the first embodiment of the present invention.
Figure 5:
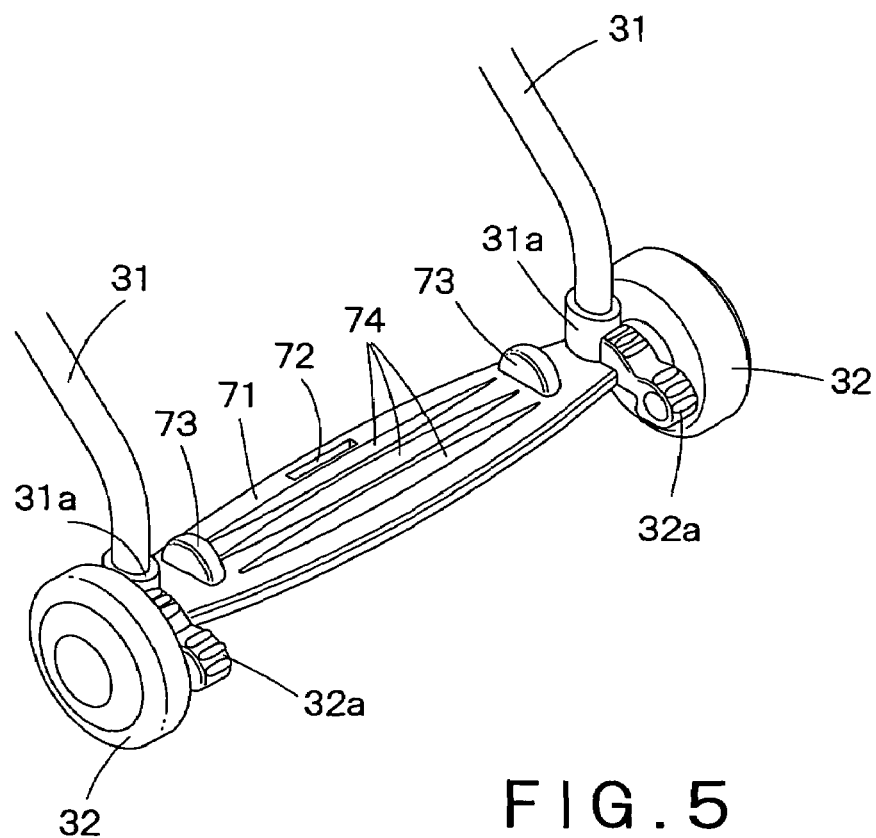
FIG. 5 is a perspective view showing a basket support member of a basket support mechanism of the stroller of the first embodiment according to the present invention.
Figure 6:
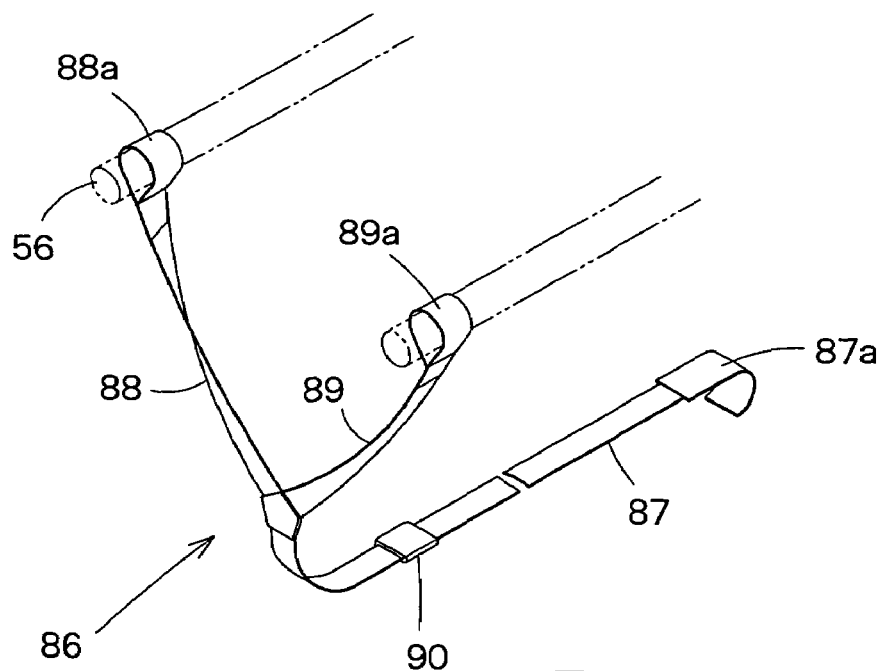
FIG. 6 is a perspective view showing a flexible member of the basket support mechanism of the stroller of the first embodiment according to the present invention.

FIGS. 1 and 2 are perspective views showing the stroller 10. FIGS. 3 and 4 are side views showing the stroller 10. FIGS. 5 and 6 are perspective views showing a basket support mechanism 70.

As shown in FIGS. 1 to 6, the stroller 10 includes a stroller body 10a, the basket support mechanism 70 for stably mounting a basket 95 on the stroller body 10a, and accessories to be attached to the stroller body 10a. Herein, the basket 95 formed of plastics or the like is, for example, a shopping basket for common use in a supermarket.

The stroller body 10a is described below. The stroller body 10a includes two front legs 11, two casings 17 secured to upper portions of the front legs 11, a handle 21 of a U-shape passing through the pair of casings 17, two rear legs 31 swingably connected to the pair of casings 17, two first links 41 connected to lower ends of the handle 21, two second links 46 connected to the pair of first links 41 and the rear legs 31, and two third links 56 connected to the second links 46 and the front legs 11.

Each of the front legs 11 has a front wheel 12 at its lower end, and each casing 17 which is secured to the upper portion of this front leg 11. The front legs 11 are connected to each other at their lower parts by a footrest 13, and at their upper parts by a connecting shaft 14.

The handle 21 passes through the casings 17. The handle 21 can be slid with respect to the casings 17 in a direction substantially parallel to the front legs 11, from a position shown in FIGS. 1 and 3 where the stroller 10 is unfolded, to a position shown in FIGS. 2 and 4 where the stroller 10 is folded.

A connecting structure of the handle 21 is described below. As shown in FIGS. 3 and 4, the handle 21 has an engagement pin 24a disposed on a lower part thereof, and an engagement pin 24b disposed on substantially a center part thereof. These engagement pins 24a and 24b are urged by springs (not shown) disposed in the handle 21 to transversely project therefrom. The engagement pins 24a and 24b are connected to an engagement pin unlocking device 24 disposed on an upper horizontal part of the handle 21 by wires or the like (not shown). By operating the engagement pin unlocking device 24, the engagement pins 24a and 24b are drawn in the handle 21 in opposition to a spring force of the springs disposed in the handle 21.

The engagement pins 24a and 24b can be engaged with an opening 18 formed in the casing 17. When the engagement pin 24a of the handle 21 and the opening 18 of the casing 17 are engaged with each other, the handle 21 can be secured to the casing 17 on a position shown in FIGS. 1 and 3. On the other hand, when the engagement pin 24b of the handle 21 and the opening 18 of the casing 17 are engaged with each other, the handle 21 can be secured to the casing 17 in a position shown in FIGS. 2 and 4.

The handle 21 has substantially a U-shape, and is slightly bent rearward at its upper part for an easy handling of the stroller 10. The upper horizontal part of the handle 21 is covered with a grip 23 formed of, e.g., rubber, so that the handle 21 can be easily gripped. A connecting shaft 22 is disposed on lower ends of the handle 21 below the casings 17. The connecting shaft 22 connects one end and the other end of the handle 21 to each other. The connecting shaft 22 passes through the handle 21 to be connected to the first links 41 disposed adjacent the handle 21.

A connecting structure of the rear legs 31 is described below with reference to FIGS. 1 and 3. Each of the rear legs 31 is connected to the casing 17 on an outside thereof in a width direction of the stroller 10, such that the rear leg 31 can swing about a pivot point 34 with respect to the casing 17. At lower ends of the rear legs 31, there are disposed two brackets 31a, and a connecting shaft 33 connecting the brackets 31a to each other. The connecting shaft 33 passes through the brackets 31a to be connected to rear wheels 32 disposed adjacent the brackets 31a. The rear legs 31 are connected to each other at their substantially central portions by a connecting shaft 35.

An upper part of each rear leg 31 is bent forward at a part above casing 17. A guard member 36 of a U-shape covered with rubber is disposed on upper ends of the rear legs 31. The rear legs 31 are connected to each other by the guard member 36. In this embodiment, the guard member 36 is formed of a material different from that of the rear legs 31. However, the guard member 36 and the rear legs 31 may be integrally formed by bending a pipe.

The front legs 11, the handle 21, and the rear legs 31 are formed by, for example, bending a pipe made of aluminum.

The casings 17 secured to the upper ends of the front legs 11 serve as armrests. Each of the casings 17 has a through-hole 19 extending substantially in parallel with the front leg 11. The handle 21 can be slid with respect to the casing 17 by passing through the through-hole 19. The through-hole 19 has therein the opening 18 which is engaged with the engagement pins 24a and 24b of the handle 21. Each rear leg 31 is swingably connected to a casing 17 about pivot point 34. A form of the casing 17 is optional, as long as the handle 21 can be slidably held and the rear legs 31 can be swingably connected to the casing 17, when the casing 17 are secured to the upper end of the front legs 11.

Connecting structures of the first links 41, the second links 46, and the third links 56 are described below. One end 41a of the first link 41 is connected through the connecting shaft 22 to the lower end of the handle 21 on an outside thereof in the width direction of the stroller 10. Thus, the first link 41 can swing about an axial center of the connecting shaft 22 with respect to the handle 21. The other end 41b of the first link 41 is connected to the second link 46 through a bracket 46a of the second link 46 connected to the rear leg 31, such that the first link 41 can swing about a pivot point 42. The first link 41 is positioned inside the rear leg 31 in the width direction of the stroller 10. The second link 46 is positioned inside the first link 41. The first link 41 is made of, for example, an aluminum bar. Both ends of the first link 41 are covered with covers 43 made of plastics.

The bracket 46a of the second link 46 is disposed at substantially a center portion of the second link 46 in the back and forth direction. When the stroller 10 is unfolded, the second link 46 is connected to the connecting shaft 35 connecting the rear legs 31 on a front side of the bracket 46a. The second link 46 is connected to the rear leg 31 through the connecting shaft 35, such that the second link 46 can swing about an axial center of the connecting shaft 35. When the stroller 10 is unfolded, the second link 46 is connected to each rear end of the third links 56 through a connecting member 51 at a front part of the stroller 10.

When the stroller 10 is unfolded, the second links 46 have a U-shaped portion 46b positioned on rear sides of the brackets 46a. The second links 46 including the U-shaped portion 46b are formed by bending, for example, a pipe made of aluminum.

The third links 56 are connected to the connecting shaft 14 connecting the front legs 11 at substantially center portions of the third links 56. Each third link 56 is connected to the front leg 11 through the connecting shaft 14, such that the third link 56 can swing about an axial center of the connecting shaft 14. The third link 56 is formed of, for example, a pipe made of aluminum.

The connecting member 51 connects the second link 46 and the third link 56 to each other. The connecting member 51 has a rotating portion 51a positioned at a center portion thereof, and two connecting portions 51b disposed on both sides of the rotating portion 51a. The connecting member 51 is made of, for example, plastics as a whole.

The connecting portions 51b of the connecting member 51 have a cylindrical shape. An end of the second link 46 and an end of the third link 56 are inserted to each of the connecting portions 51b. The ends of the second link 46 and the third link 56 are fastened to the connecting portions 51b of the connecting member 51, with screws disposed on sides of the connecting portions 51b.

The connecting portions 51b of the connecting member 51 can swing, within a range of 180°, about a pivot point 52 of the rotating portion 51b. In a state shown in FIGS. 2 and 4, the connecting portions 51b can swing about the rotating portion 51a only in an upward direction, and cannot swing in a downward direction anymore.

As shown in FIGS. 1 and 3 where the stroller 10 is unfolded, the second link 46 and the third link 56 are aligned with each other. The second links 46, the third links 56, and the connecting member 51 are positioned inside the front legs 11 and the handle 21 in the width direction of the stroller 10.

The basket support mechanism 70 for stably mounting the basket 95 on the stroller body 10a is described below. As shown in FIG. 3, the basket support mechanism 70 includes a basket support member 71 for supporting the basket 95, and a flexible member disposed between the basket support member 71 and a front upper part of the stroller body 10a.

In this embodiment, as shown in FIG. 3, the basket support member 71 are disposed between the brackets 31a disposed on the lower ends of the rear legs 31 to connect the rear legs 31 to each other. The basket support member 71 has a rectangular cross-section with a lower part thereof being opened. The connecting shaft 33 of the rear wheels 32 is placed in the opened space of the basket support member 71. The basket support member 71 formed of, e.g., plastics is integrally formed with the brackets 31a.

As shown in FIG. 5, an elongated engagement opening 72 is formed on an upper surface of the basket support member 71. The engagement opening 72 is engaged with a hook 87a of a flexible member 86 which are described hereinafter. Two projections 73 are disposed on both end edges of the upper surface of the basket support member 71. Each projection 73 has a semicircular shape and extends in the back and fourth direction of the stroller 10. The pair of projections 73 prevents the basket 95 from moving in a width direction of the stroller 10 so as to make the basket 95 to be in position. A ridge 74 extending in the width direction of the stroller 10 is formed on the upper surface of the basket support member 71. The ridge 74 prevents the basket 95 from moving in the back and forth direction of the stroller 10.

In FIG. 5, a brake 32a is disposed between rear wheel 32 and the basket support member 71.

The flexible member 86 is described below. As shown in FIG. 6, the flexible member 86 has a first belt 87, a second belt 88, and a third belt 89, which are connected to each other. The second belt 88 and the third belt 89 have the same length. The flexible member 86 is formed of a belt having a Y-shape as a whole. The first belt 87, the second belt 88, and the third belt 89 are formed of, for example, a reinforced strip of cloth.

The first belt 87 has at its end a hook 87a made of metal or plastics, which is engaged with the engagement opening 72 of the basket support member 71. By engaging the hook 87a with the engagement opening 72 of the basket support member 71, the end of the first belt 87 of the flexible member 86 can be connected to the basket support member 71. The first belt 87 has a buckle 90 for adjusting a length of the first belt 87.

The second belt 88 and the third belt 89 have the same structure. As shown in FIG. 6, ends of the second and the third belts 88 and 89 are folded back and stitched to a reminder of these belts 88 and 89 so as to form ring-shaped engaging portions 88a and 89a. By inserting front ends of the third links 56 of the stroller body 10a to the respective ring-shaped engaging portions 88a and 89a, the second belt 88 and the third belt 89 of the flexible member 86 can be connected to the pair of third links 56 constituting a seat support part 64 of the stroller body 10a. In order that the engaging portions 88a and 89a of respective second and third belts 88 and 89 are prevented from being easily detached from the third links 56 of the stroller body 10a, it is preferable that the front ends of the third links 56 are bent, or the third links 56 have engagement members engaging with the engaging portions 88a and 89a.

Accessories to be attached to the stroller body 10a are described below.

Bracket 53 are disposed between the ends of the second links 46 and the brackets 46a of the stroller body 10a. A backrest 61 as one of the accessories is swingably attached to the second links 46 through the brackets 53 (illustrated especially in FIG. 3). The backrest 61 can be fixed at every angle until the backrest 61 contacts the U-shaped portion 46b of the second links 46, that is, the backrest 61 lies almost horizontally. In this embodiment, the backrest 61 has a backrest part 61a, and a pair of guide parts 61b of a semicircular shape disposed on both sides of the backrest part 61a. In this embodiment, the bracket 53 is integrally formed with connecting portions 51b of the connecting member 51.

The third links 56 and parts of the second links 46 on a side of the third links 56 with respect to the brackets 53 constitute a seat support part 64 on which a seat plate (not shown) is disposed.

When a sponge or the like is disposed on the backrest 61 and the seat plate to impart a cushion property thereto, a baby can be directly seated thereon. In a case where a newborn baby is seated, it is preferable that a soft sheet material (not shown) on which the baby is laid is additionally disposed on the backrest 61 and the seat plate.

A hood as one of the accessories is described below. A first hood rod 68 is swingably attached to the second links 46 through the brackets 46*a* (illustrated especially in FIGS. 3 and 4). The first hood rod 68 can be fixed at a predetermined angle with respect to the second links 46. A second hood rod 69 is disposed between right and left edges of the handle 21 near the upper bent part thereof (FIG. 1). By providing a hood (not shown) made of a cloth between the first hood rod 68 and the backrest 61 through the second hood rod 69, the stroller 10 can be covered with the hood. The hood can be detached from the stroller 10 if needed.

An operation of the embodiment as constituted above will be described below.

A manner for folding the unfolded stroller 10 is described. The handle 21 is pushed toward the casings 17, with the engagement pin unlocking device 24 being operated. By operating the engagement pin unlocking device 24 of the handle 21, the engagement pin 24*a* of the handle 21 engaged with the opening 18 of the casing 17 is detached from the opening 18, and is drawn into the handle 21. At the same time, an engagement pin disposed at substantially the center portion of the handle 21 is also drawn into the handle 21. Thus, the handle 21 can be guided to the through-hole 19 of the casing 17, and slid in the direction substantially in parallel with the front legs 11.

Accompanied with a downward movement of the handle 21, the one end 41*a* of the first link 41 connected to the lower end of the handle 21 is moved downward. The other end 41*b* of the first link 41 is connected to the second link 46 through the bracket 46*a*. Thus, the first link 41 is moved downward while swinging about an axial center of the connecting shaft 22 counterclockwise with respect to the handle 21.

As described above, the second link 46 connected to the other end 41*b* of the first link 41 is swingably connected to rear leg 31 through the connecting shaft 35. Thus, accompanied with downward movement of one end 41*a* of the first link 41, the second link 46 swings about an axial center of the connecting shaft 35 clockwise with respect to the rear leg 31.

The end of the second link 46 is connected to the end of the third link 56 through the connecting member 51, while the third link 56 is connected to the front leg 11 through the connecting shaft 14. Thus, accompanied with the clockwise movement of the second link 46 about the axial center of the connecting shaft 35 with respect to the rear leg 31, the third link 56 swings about an axial center of the connecting shaft 14 counterclockwise with respect to the front leg 11.

In this way, the second link 46 and the third link 56, which are aligned with each other when the stroller 10 is unfolded (see FIG. 3), are folded at the pivot point 52 with the rotating portion 51*a* of the connecting member 51 being projected upward (see FIG. 4). Since the front legs 11 and the rear legs 31 swing about the pivot point 34 to come close to each other, a gap between the connecting shaft 14 connected to the front legs 11 and the connecting shaft 35 connected to the rear legs 31 are narrowed.

After the handle 21 is pushed into the casings 17, operation of the engagement pin unlocking device 24 is finished. Then, the engagement pin 24*b* of the handle 21 is engaged with the opening 18 of the casing 17 so as to secure the handle 21 to the casing 17. Thus, the stroller 10 can be maintained in a folded state.

As shown in FIGS. 2 and 4, the folded stroller 10 can have reduced dimensions in the back and forth direction as well as in a height direction. Thus, when walking up the stairs with the folded stroller 10, one does not have to raise his or her arm.

As described above, the stroller 10 can be folded simply by pushing the handle 21 downward, with operating the engagement pin unlocking device 24 disposed on the handle 21. Therefore, the stroller 10 can be folded using only one hand.

When the stroller 10 is unfolded (FIG. 3), the U-shaped portion 46*b* of the second links 46 projects rearward, while the guard member 36 projects forward. As shown in FIGS. 2 and 4 where the stroller 10 is folded, the U-shaped portion 46*b* and the guard member 36 can be folded in a compact configuration.

On the other hand, when the folded stroller 10 is unfolded, the handle 21 is pulled up with the engagement pin unlocking device 24 being operated. Then, the stroller 10 is unfolded in a manner reverse to the situation where the stroller 10 is folded. Thus, the stroller 10 can also be unfolded using only one hand.

In order to use the unfolded stroller 10, the guard member 36 is detached from the front legs 11, and a baby is seated on the seat plate (not shown) of the stroller 10. Then, the guard member 36 is reattached to the front legs 11, and a reclining angle of the backrest 61 is adjusted.

The seat plate is placed on the seat support part 64 formed by the third links 56 and the parts of the second links 46 on the side of the third links 56 with respect to the brackets 53. As described above, second link 46 and third link 56 are connected to each other by the connecting member 51 whose swinging angle is limited. That is, the second link 46 and the third link 56, which are aligned with each other as shown in FIGS. 1 and 3, cannot swing about rotating portion 51*a* of the connecting member 51 with the rotating portion 51*a* projecting in a downward direction. Thus, when a baby is seated on the seat plate, sagging of the seat plate is prevented so that the baby can be safely seated in the stroller 10.

The backrest 61 can be reclined to an angle substantially in parallel with the seat plate. Thus, a newborn baby can be laid on the seat plate and the backrest 61.

An operation of the basket support mechanism 70 is described below. The ring-shaped engaging portion 88*a* of the second belt 88 and the ring-shaped engaging portion 89*a* of the third belt 89 of the flexible member 86 are respectively engaged with the front ends of the third links 56 of the stroller 10*a*. The hook 87*a* of the third belt 87 of the flexible member 86 is fitted in the engagement opening 72 of the basket support member 71. Then, the seat support part 64 of the stroller body 10*a* and the basket support member 71 are connected to each other by the flexible member 86.

After the length of the first belt 87 is adjusted by the buckle 90 of the first belt 87, the basket 95 is inserted from between the rear legs 31 of the stroller body 10*a* toward a front part of the stroller 10. The basket 95 is guided in the back and forth direction of the stroller 10, with a displacement of the basket 95 in the width direction being prevented by the projections 73 of the basket support member 71. The basket 95 is inserted such that a front end thereof is brought into contact with the flexible member 86. As shown in FIG.

3, a rear side of the basket 95 is supported by the basket support member 71, while a front end thereof is supported by the flexible member 86. Thus, the basket 95 can be mounted on the stroller 10 in substantially a horizontal direction below the second link 46 and the third link 56 aligned with each other (FIG. 3).

Since the basket 95 is mounted below the seat support part 64 of the stroller body 10a, the basket 95 can be mounted on the stroller 10, while keeping a baby in the stroller 10. The ridge 74 is disposed on the upper surface of the basket support member 71 on which the basket 95 is placed. Thus, the basket 95 can be prevented from being displaced in the back and forth direction of the stroller 10. The pair of projections 73 are disposed on end edges of the upper surface of the basket support member 71. Since the projections 73 abut on the basket 95, the basket 95 can be prevented from being displaced in the width direction of the stroller 10. Therefore, the basket 95 can be stably held on the stroller 10.

In the case where the basket 95 loses balance because of an inappropriate containing manner of commodities contained therein, the basket 95 may be easily dropped out of the stroller 10. In this instance, the basket 95 is first taken out of the stroller 10, and then the length of the first belt 87 is adjusted by the buckle 90 of the flexible member 86. Next, the basket 95 is again mounted on the stroller 10. In this case, the basket 95 is inclined with its front part being oriented downward. The flexible member 86 in front of the basket 95 prevents the basket 95 from being dropped from the front part of the stroller 10. Thus, the basket 95 can be stably mounted on the stroller 10.

Since the flexible member 86 is formed of, for example, a flexible cloth, the flexible member 86 can be folded into a small size. Further, the flexible member 86 can easily be attached to the stroller body 10a and the basket support member 71, and detached therefrom. Therefore, the flexible member 86 can be conveniently carried about, to and from a supermarket.

As described above, according to the present invention, the unfolded stroller 10 can be folded, by pushing the handle 21 downward and operating the engagement pin unlocking device 24. The folded stroller 10 can be unfolded in accordance with a procedure reverse to the above. Thus, the stroller 10 can easily be folded and unfolded using only one hand.

Since the handle 21 is slid downward to the casings 17, the folded stroller 10 can have reduced dimensions in the back and forth direction as well as the height direction. Thus, when carrying the folded stroller 10, it is unnecessary to raise one's hand together with the stroller 10. In addition, such a compact stroller 10 is easy to be stored.

The seat plate is placed on the seat support part 64 formed by the third links 56 and the parts of the second links 46 on the side of the third links 56 with respect to the brackets 53. In order to prevent sagging of the seat plate, the first link 41 and the second link 46 are connected to each other by the connecting member 51. Thus, a baby can be safely seated on the seat plate. The backrest 61 can be reclined to an angle substantially parallel with the seat plate. Since respective shafts are placed in a direction perpendicular to the back and forth direction of the stroller 10, a rigidity of stroller 10 can be improved as a whole. Consequently, the stroller 10 according to the present invention is well suited for all children of all ages in need of the stroller 10, including a newborn baby.

The third links 56 and the second links 46 serve as the seat support part 64. That is, only the first links 41 are members having only one function for folding the stroller 10. Because of a fewer number of constituent members and a simple structure of the stroller 10, the stroller 10 can be light-weighted, and a manufacturing cost therefor can be reduced.

The stroller 10 further includes the basket support mechanism 70 which has the basket support member 71 disposed between the lower ends of the rear legs 31 of the stroller body 10a, and the flexible member 86 for connecting the basket support member 71 and the seat support part 64 to each other. When the shopping basket 95 is inserted from between the rear legs 31 to the front part of the stroller 10, a rear side of the basket 95 is supported by the basket support member 71, while the front end of the basket 95 is supported by the flexible member 86. Thus, the basket 95 can be easily mounted on the stroller 10 below the second links 46 and the third links 56 constituting the seat support part 64 of the stroller body 10a, while keeping a baby in the stroller 10.

On the upper surface of the basket support member 71, there are disposed the ridge 74 for preventing a displacement of the basket 95 in the back and forth direction, and the projections 73 for preventing a displacement of the basket 95 in the width direction so as to place the basket 95 in position. Thus, the basket 95 can be easily and stably mounted on the stroller 10.

The flexible member 86 is formed of, for example, a flexible cloth, and can easily be attached to the stroller body 10a and the basket support member 71, and detached therefrom. Thus, by folding the flexible member 86 into a small size, the flexible member 86 can be easily carried about, on the way to and from a supermarket.

In the above embodiment, the basket support member 71 has the engagement opening 72 on its upper surface. The first belt 87 of the flexible member 86 has the hook 87a on the end of the first belt 87. Thus, the basket support member 71 and the flexible member 86 can be connected to each other by engaging the hook 87a with the engagement opening 72. However, not limited to this embodiment, the basket support member 71 and the flexible member 86 may be connected to each other by using other fastening means.

In the above embodiment, the second belt 88 of the basket support member 70 has the ring-shaped engaging portion 88a on the end of the second belt 88. The third belt 89 of the basket support member 70 has the ring-shaped engaging portion 89a on the end of the third belt 89. Thus, the seat support part 64 of the stroller body 10a and the flexible member 86 can be connected to each other by inserting the ends of the third links 56 constituting the seat support part 64 of the stroller body 10a, into the rink-shaped engaging portions 88a and 89a. However, not limited to this embodiment, the seat support part 64 of the stroller body 10a and the flexible member 86 may be connected to each other by using other fastening means.

In the above embodiment, the flexible member 86 is formed of, for example, a reinforced strip of cloth. However, not limited to this embodiment, the flexible member 86 may be formed of a strip of leather or a sheet of cloth.

Figure 7:
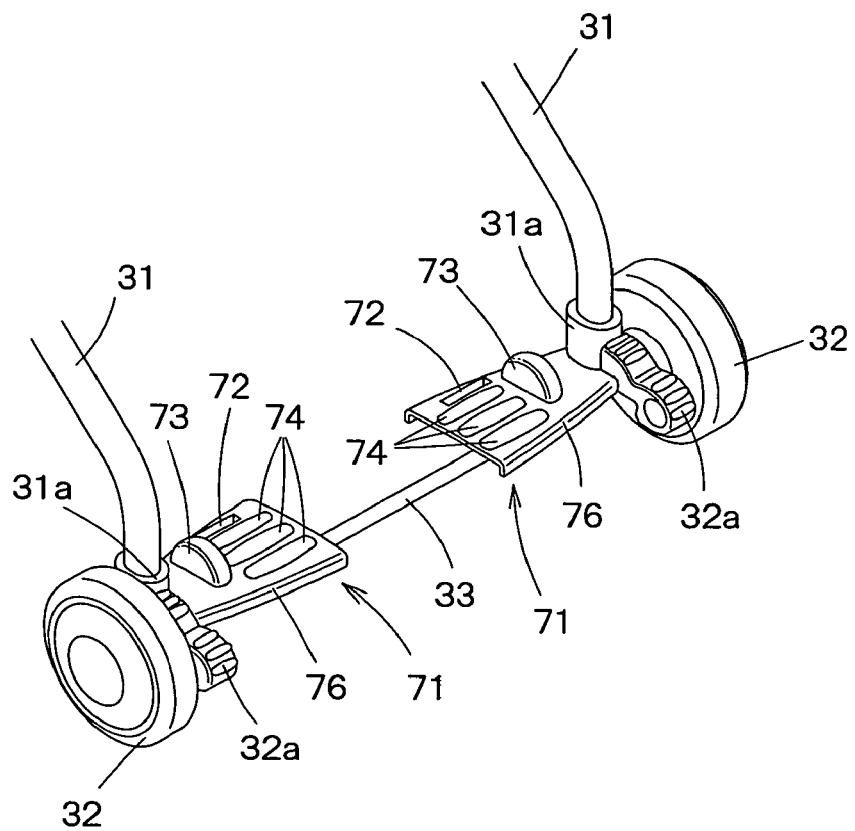
FIG. 7 is a perspective view showing an alternative example of the basket support mechanism of the stroller according to the present invention.
Figure 8:
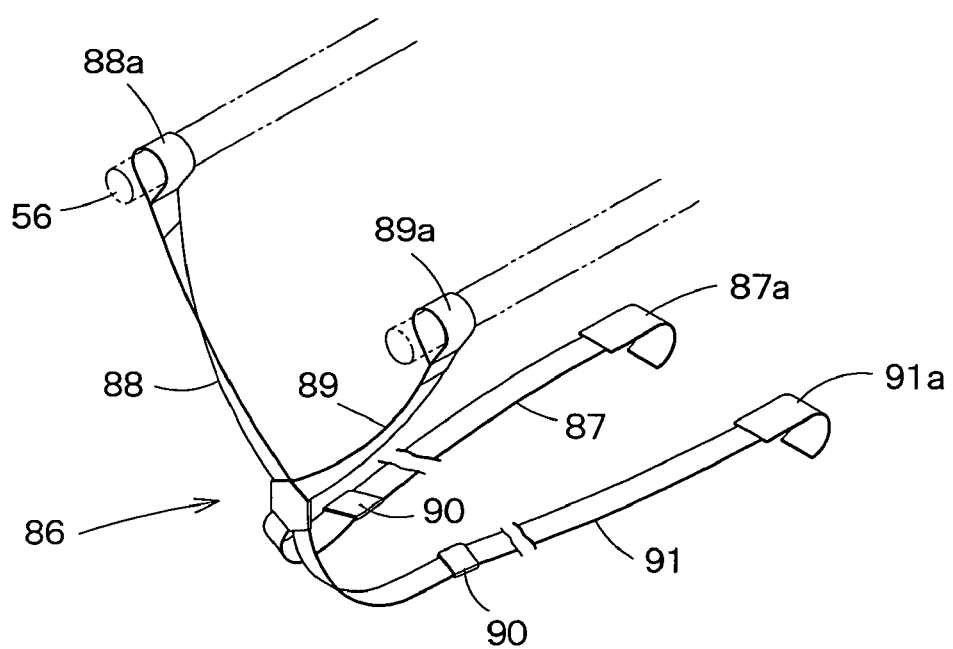
FIG. 8 is a perspective view showing an alternative example of the flexible member of the basket support mechanism of the stroller according to the present invention.

An alternative example of the basket support mechanism 70 will be described below with reference to FIGS. 7 and 8. In FIGS. 7 and 8, the identical components to those of the first embodiment shown in FIGS. 5 and 6 are represented by the same reference numerals, and a detailed description thereof is omitted.

FIG. 7 is a perspective view showing the basket support member 71 of the basket support mechanism 70.

As shown in FIG. 7, the basket support member 71 has two support projected parts 76, which are oppositely extended from lower ends of the rear legs 31 of the stroller body 10a. Respective support projected parts 76 are integrally formed with the two brackets 31a disposed on the lower ends of the rear legs 31 of the stroller body 10a. Similar to the embodiment shown in FIG. 5, each of the support projected parts 76 has on its upper surface a ridge 74, a projection 73, and an engagement opening 72.

FIG. 8 shows flexible member 86 of the basket support mechanism 70.

As shown in FIG. 8, the flexible member 86 of the basket support mechanism 70 has a first belt 87, a second belt 88, a third belt 89, and a fourth belt 91, which are connected to one another at one point. The first belt 87 and the fourth belt 91 have the same length. The second belt 88 and the third belt 89 have the same length. The flexible member 86 is formed of a belt having an X-shape as a whole.

The first belt 87 has at its end a hook 87a made of metal or plastics, which is engaged with one of the engagement openings 72 of the basket support member 71. The forth belt 91 has at its end a hook 91a made of metal or plastics, which is engaged with another of the engagement openings 72 of the basket support member 71. By engaging the hooks 87a and 91a with the engagement openings 72 of the basket support member 71, an end of the first belt 87 and an end of the fourth belt 91 of the flexible member 86 can be connected to the basket support member 71. Similar to the first belt 87, the fourth belt 91 has buckle 90 for adjusting a length of the fourth belt 91.

Similar to the embodiment shown in FIG. 6, the second belt 88 and the third belt 89 have the same structure. Ring-shaped engaging portions 88a and 89a are formed at the ends of the second and the third belts 88 and 89. By inserting front ends of third links 56 of the stroller body 10a into the ring-shaped engaging portions 88a and 89a, the second belt 88 and the third belt 89 of the flexible member 86 can be respectively connected to the third links 56 constituting the seat support part 64 of the stroller body 10a.

A rear side of basket 95 is supported by the support projected parts 76 of the basket support members 71, while a front end of the basket 95 is supported by the flexible member 86. Thus, the basket 95 can be stably mounted on the basket support mechanism 70.

According to the above alternative example, the basket 95 can be stably mounted on the basket support mechanism 70. In addition, the basket support member 71 of the basket support mechanism 70 has a relatively simple structure, so that a material cost and an assembling cost can be reduced.

Figure 9:
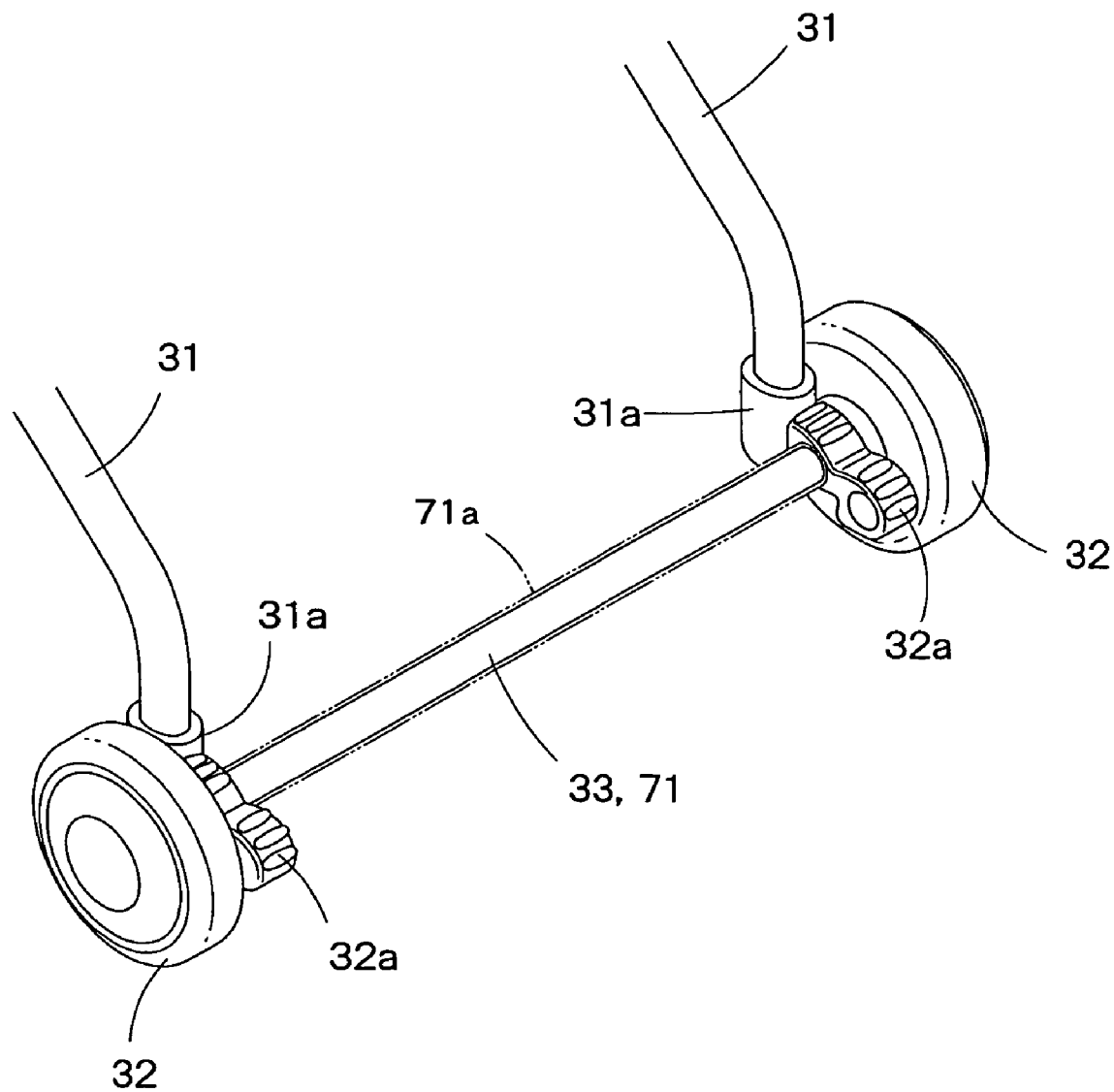
FIG. 9 is a perspective view showing an another alternative example of the basket support mechanism of the stroller according to the present invention.

Another alternative example of the basket support mechanism 70 will be described below with reference to FIG. 9. In FIG. 9, the identical components to those of the first embodiment shown in FIGS. 5 to 8 are represented by the same reference numerals, and a detailed description thereof is omitted.

FIG. 9 is a perspective view showing basket support member 71 of the basket support mechanism 70.

As shown in FIG. 9, the basket support member 71 of the basket support mechanism 70 is formed of the connecting shaft 33 connecting lower ends of the rear legs 31 of the stroller body 10a. The connecting shaft 33 serves as an axle of the rear wheels 32. The flexible member 86 shown in FIGS. 6 and 8 can be used. By engaging the hooks 87a and 91a with the connecting shaft 33, the flexible member 86 and the connecting shaft 33 as the basket support member 71 can be connected to each other. Thus, basket 95 can be stably mounted on the basket support mechanism 70, with the rear side of the basket 95 being supported by the connecting shaft 33, while a front end of the basket 95 is supported by the flexible member 86.

According to the alterative example, the basket 95 can be stably mounted on the basket support mechanism 70. Further, since the connecting shaft 33 of the rear wheels 32 also serves as the basket support member 71 of the basket support mechanism 70, a structure of the stroller 10 is simplified, so that a material cost and an assembling cost can be reduced.

In this example, the basket support member 71 of the basket support mechanism 70 is formed of the connecting shaft 33. However, not limited thereto, the basket support member 71 of the basket support mechanism 70 may be formed of a connecting shaft sleeve 71a covering the connecting shaft 33.

Not limited to a Y-shape or an X-shape, the flexible member 86 of the present invention may have an H-shape, I-shape, triangular shape, rectangular shape, or sheet-like shape, as long as the flexible member 86 can connect the stroller body 10a and the basket support member 71 to each other to support the basket 95 along with the basket support member 71.

Second Embodiment

Figure 10:
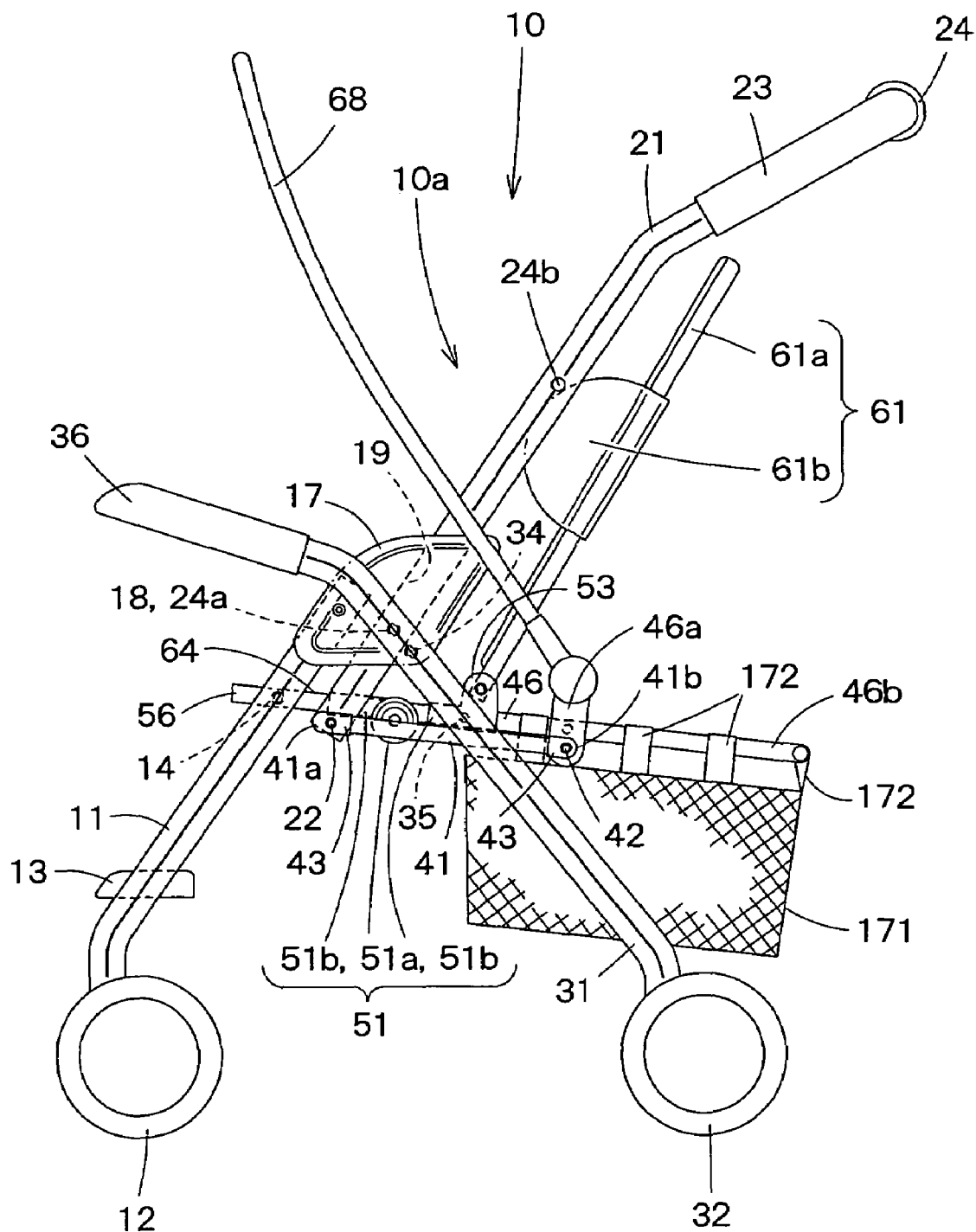
FIG. 10 is a side view showing an unfolded stroller of a second embodiment of the present invention.
Figure 11:
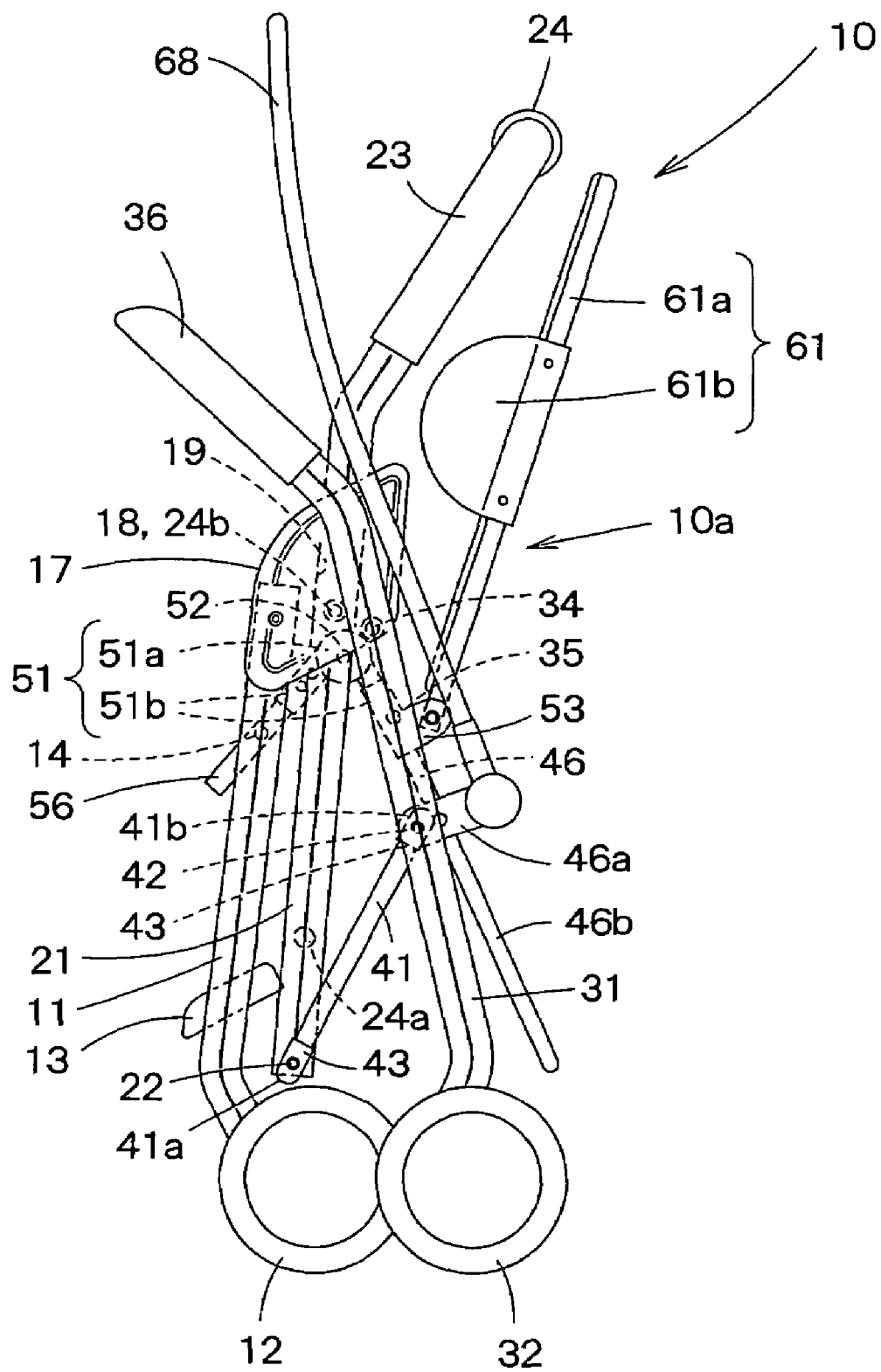
FIG. 11 is a side view showing the folded stroller of the second embodiment of the present invention.

A second embodiment of the present invention will be described below with reference to the drawings. FIGS. 10 and 11 show stroller 10 of a second embodiment according to the present invention.

FIG. 10 is a side view showing unfolded stroller 10, and FIG. 11 is a side view showing folded stroller 10.

Except a structure for supporting a basket 171, the stroller 10 of the second embodiment shown in FIGS. 10 and 11 has substantially the same structure as that of the stroller 10 of the first embodiment shown in FIGS. 1 to 9. In FIGS. 10 and 11, identical components to those of the first embodiment shown in FIGS. 1 to 9 are represented by the same reference numerals, and a detailed description thereof is omitted.

As shown in FIGS. 10 and 11, similar to the first embodiment shown in FIGS. 1 to 9, the stroller 10 includes stroller body 10a, and accessories to be attached to the stroller body 10a. The stroller body 10a includes two front legs 11, two casings 17 secured to the upper portions of the front legs 11, a handle 21 of a U-shape passing through the casings 17, two rear legs 31 swingably connected to the casings 17, two first links 41 connected to the lower ends of the handle 21, two second links 46 connected to the first links 41 and the rear legs 31, and two third links 56 connected to the second links 46 and the front legs 11.

The basket 171 as an accessory for containing therein baggage is disposed below the second links 46. The basket 171 made of a cloth has a hanging portion 172 at an upper part thereof. The basket 171 is attached to the stroller 10 by hanging the hanging portion 172 of the basket 171 on the second links 46 including a U-shaped portion 46b. When the stroller 10 is unfolded, the U-shaped portion 46b of the second links 46 sufficiently projects rearward. Thus, it is easy take baggage in and out of the basket 171.

An operation of the embodiment as constituted above is described below.

The U-shaped portion 46b of the second links 46 sufficiently projects rearward, and the basket 171 for containing therein baggage is hung on the U-shaped portion 46b. Thus, as compared with a basket disposed below the seat plate, it is considerably easier to take baggage in and out of the basket 171.

Further, in folding the stroller 10, the U-shaped portion 46b is folded substantially parallel with the rear legs 31. Thus, the stroller 10 can be folded into a small size.

The third links 56 and the second links 46 serve as seat support part 64. The second links 46 also serve as a basket holding rod for hanging the basket 171 for containing therein baggage. That is, only the first links 41 are members having only one function for folding the stroller 10. Because of a fewer number of constituent members and a simple structure of the stroller 10, the stroller 10 can be light-weighted, and a manufacturing cost therefor can be reduced.

The invention claimed is:

1. A stroller comprising:
   a stroller body including two front legs, two rear legs, a handle, and a seat support part; and
   a basket support mechanism including a basket support member below said rear legs, and a flexible member extending from said basket support member to a front upper part of said stroller body,
   wherein said basket support member and said flexible member are for supporting a basket thereon such that the basket can be easily removed from said basket support member and said flexible member.

2. The stroller according to claim 1, wherein said basket support member interconnects said two rear legs.

3. The stroller according to claim 2, wherein said basket support member comprises one of
   (i) a shaft interconnecting rear wheels attached to said two rear legs, and
   (ii) a sleeve covering a shaft interconnecting rear wheels attached to said two rear legs.

4. The stroller according to claim 1, wherein said basket support member comprises a first support part extending in a first direction from one of said two rear legs, and a second support part extending in an opposite second direction from the other of said two rear legs.

5. The stroller according to claim 1, wherein said basket support member has a projection to be engaged with the basket.

6. The stroller according to claim 1, wherein said flexible member is detachably connected to said basket support member and said front upper part of said stroller body.

7. The stroller according to claim 1, wherein said flexible member has a hook, and said basket support member has an engagement opening to be engaged with said hook.

8. The stroller according to claim 1, wherein said front upper part of said stroller body includes said seat support part of said stroller body.

9. The stroller according to claim 1, wherein said flexible member comprises a belt.

10. The stroller according to claim 1, wherein said flexible member is Y-shaped.

11. A stroller comprising:
    two front legs;
    two casings secured to upper portions of said two front legs;
    two rear legs swingably connected to said two casings;
    a handle slidably passing through said two casings;
    two first links swingably connected to said handle below said two casings;
    two second links swingably connected to said two first links and swingably connected to said two rear legs; and
    two third links swingably connected to said two second links and swingably connected to said two front legs,
    wherein the stroller can be folded and unfolded by sliding said handle relative to said two casings.

12. The stroller according to claim 11, wherein said two second links and said two third links are aligned with each other when the stroller is unfolded.

13. The stroller according to claim 11, wherein said two third links constitute a seat support part.

14. The stroller according to claim 11, wherein said two third links and parts of said two second links on a side of said two third links constitute a seat support part.

15. The stroller according to claim 11, further comprising: a backrest swingably attached to said two second links.

16. The stroller according to claim 11, wherein said two second links have a U-shaped portion, projected rearward of said two rear legs, for hanging thereon a basket.

17. The stroller according to claim 11, further comprising: a guard member on upper portions of said two rear legs.

* * * * *